United States Patent

Wolff et al.

[11] Patent Number: 5,982,745
[45] Date of Patent: Nov. 9, 1999

[54] LAN BRIDGING REDUNDANCY

[75] Inventors: Mark Wolff, Ottawa; Phil Worthington, Nepean; Merrill Arcand, Kemptville; Brian Wirth, Ottawa; Alain Brazeau, Stittsville, all of Canada

[73] Assignee: Newbridge Networks Corporation, Kanata, Canada

[21] Appl. No.: 08/913,719

[22] PCT Filed: Mar. 20, 1996

[86] PCT No.: PCT/CA96/00175

§ 371 Date: Nov. 17, 1997

§ 102(e) Date: Nov. 17, 1997

[87] PCT Pub. No.: WO96/29807

PCT Pub. Date: Sep. 26, 1996

[30] Foreign Application Priority Data

Mar. 21, 1995 [GB] United Kingdom ............... 9505722

[51] Int. Cl.[6] ............................... H04J 1/16; H04J 3/14
[52] U.S. Cl. ..................... 370/219; 370/402; 370/220
[58] Field of Search ................................ 370/216, 220, 370/390, 389, 901, 395, 905, 401, 908, 402, 285, 219, 911, 229, 235, 360, 362, 392, 230

[56] References Cited

U.S. PATENT DOCUMENTS

| | | | |
|---|---|---|---|
| 5,387,769 | 2/1995 | Kupersmith et al. | 370/402 |
| 5,473,599 | 12/1995 | Li et al. | 370/402 |
| 5,490,140 | 2/1996 | Abensour et al. | 370/352 |
| 5,490,252 | 2/1996 | Macera et al. | 370/402 |
| 5,692,126 | 11/1997 | Templeton et al. | 370/401 |
| 5,696,763 | 12/1997 | Gang, Jr. | 370/401 |
| 5,781,530 | 7/1998 | Segal | 370/220 |

*Primary Examiner*—Chau Nguyen
*Assistant Examiner*—Phirin Sam
*Attorney, Agent, or Firm*—Marks & Clerk

[57] ABSTRACT

In a method implementing redundancy in LAN/WAN bridging/switching elements, LAN/WAN traffic is sent to active and inactive elements using multicast techniques. The active element bridges the data traffic and the inactive drops it.

8 Claims, 1 Drawing Sheet

LAN BRIDGING REDUNDANCY

The present invention relates to a method of implementing redundancy in LAN bridging/switching elements.

Redundancy is implemented in LAN bridging/switching elements in case of equipment failure. Implementing such redundancy is complicated because both elements must be constantly kept informed of network status changes. Furthermore, some switching techniques (e.g. LAN bridges) must be employed to monitor the data to decide on network topology.

The problem is that two independent switching/bridging elements that are configured to be redundant have to communicate this information to each other. If the data traffic has to be communicated to the inactive element in the redundant pair, then a large bandwidth pipe (typically a backplane or secondary high speed bus) must interconnect the two elements.

Alternatively, the newly active element must re-learn the new topology or network status by either asking another network element or by monitoring the data/protocols. This technique suffers from the disadvantage that there is a fairly large delay (incurred by this re-learning process) before traffic can resume as normal.

According to the present invention there is provided a method implementing redundancy in LAN bridging/switching elements wherein LAN traffic is sent to active and inactive elements using a multicast addressing technique.

The invention enables LAN to WAN Redundancy to be implemented using Multicast addressing, LAN protocol snooping, and a WAN wiring Hub.

LAN traffic destined for a traffic bridging element that is configured for redundancy is sent to both the active and inactive elements using multicast addresses.

In this specification, the term 'active' element refers to a switching element that is actively switching/bridging the traffic. 'Inactive' element refers to the LAN element that is passively listening/snooping the traffic, i.e. not switching the traffic. Data traffic is dropped by the inactive element.

The active element receiving the traffic can switch/bridge the traffic. The inactive element monitors the traffic and/or any protocols but does not switch the data. The appropriate control or status protocols are snooped (e.g. LAN bridges may snoop spanning tree protocols) in an attempt to remain in step with the status of the network. If activity switches to the 'inactive' (newly active) element, then the newly active element can assume immediate control without having to 'relearn' or renegotiate network status. The result is a reduction in lost data during activity switches.

The invention also provides a system for transferring data traffic between a frame relay network and an ATM network, comprising a pair of frame relay to ATM (FRATM) bridges, each said FRATM bridge being capable of transferring traffic between frame relay and ATM networks, and said FRATM bridges being capable of alternately being in an inactive standby mode and an active mode, the FRATM bridge in the active mode processing the data traffic for transfer between said networks, and the FRATM bridge in the standby mode merely snooping the data traffic to remain current as to network status; a frame relay engine for sending frame relay traffic to said FRATM bridges in both the inactive and active modes using multicast addressing over a LAN; a wiring hub for connecting the FRATM bridges over a common link to an ATM network; and means for switching said FRATM bridges between the inactive and active modes, whereby the FRATM bridge previously in the inactive mode assumes the processing of the data traffic from the FRATM bridge that was previously in the active mode.

The invention will now be described in more detail, by way of example only, with reference to the accompanying drawings, in which:-

Figure 1:
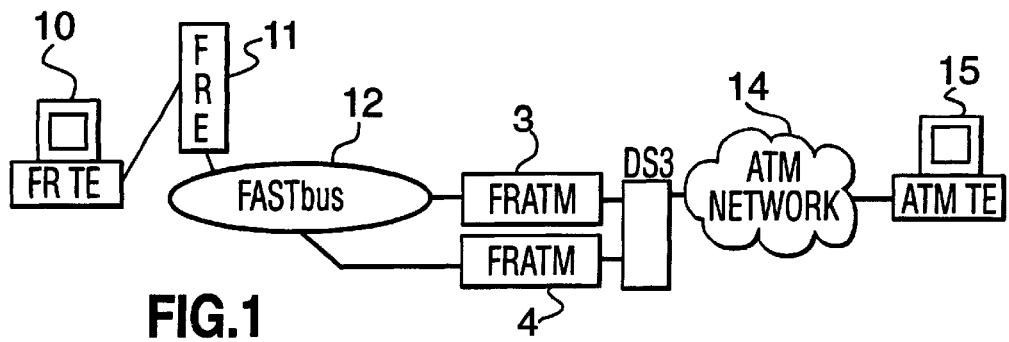
FIG. 1 is a block diagram of a typical system employing a FRATM bridge.

Referring to FIG. 1, a Frame relay terminal 10 communicates with a Newbridge Networks Corporation Fastbus™ 12 through a frame relay engine 11. The Fastbus 12 is connected to a FRATM interworking units 3, 4 connected via a DS3 link to ATM network 14, which in turn is connected to an ATM terminal 15.

The Frame Relay to ATM (FRATM) Interworking units 3, 4 effects high performance frame relay to ATM switching. FRATM stands for Frame Relay/Asynchronous Transfer Mode and describes an interworking unit, for example, allowing Frame Relay Engine (FRE) Cards on a Newbridge Mainstreet™ 36120 to connect to a 36150/36170 MainStreet ATMnet™ or a third-party ATM network. A single FRATM is capable of switching simultaneously in each direction between the FASTbus and a T3/E3 ATM link.

The main function of the FRATM units 3, 4 is to switch frames between FASTbus Data Link Connections (DLCs) and corresponding ATM Virtual Circuit Connections (VCCs). DLC connections are formed between the FRATM 13 and FRE cards 11 over the FASTbus 12 interface. VCC connections are between the FRATM and ATM entity using the T3/E3 interface. Such connections form part of Permanent Virtual connections (PVCs), which are end-to-end logical connections that extend between two user/network interfaces.

A single PVC may pass through one or more Frame Relay and ATM switching nodes. Thus the FRATM performs interworking services between Frame Relay and ATM services.

The FRATM units 3, 4 is used to extend large private and public frame relay networks over ATM.

Figure 2:
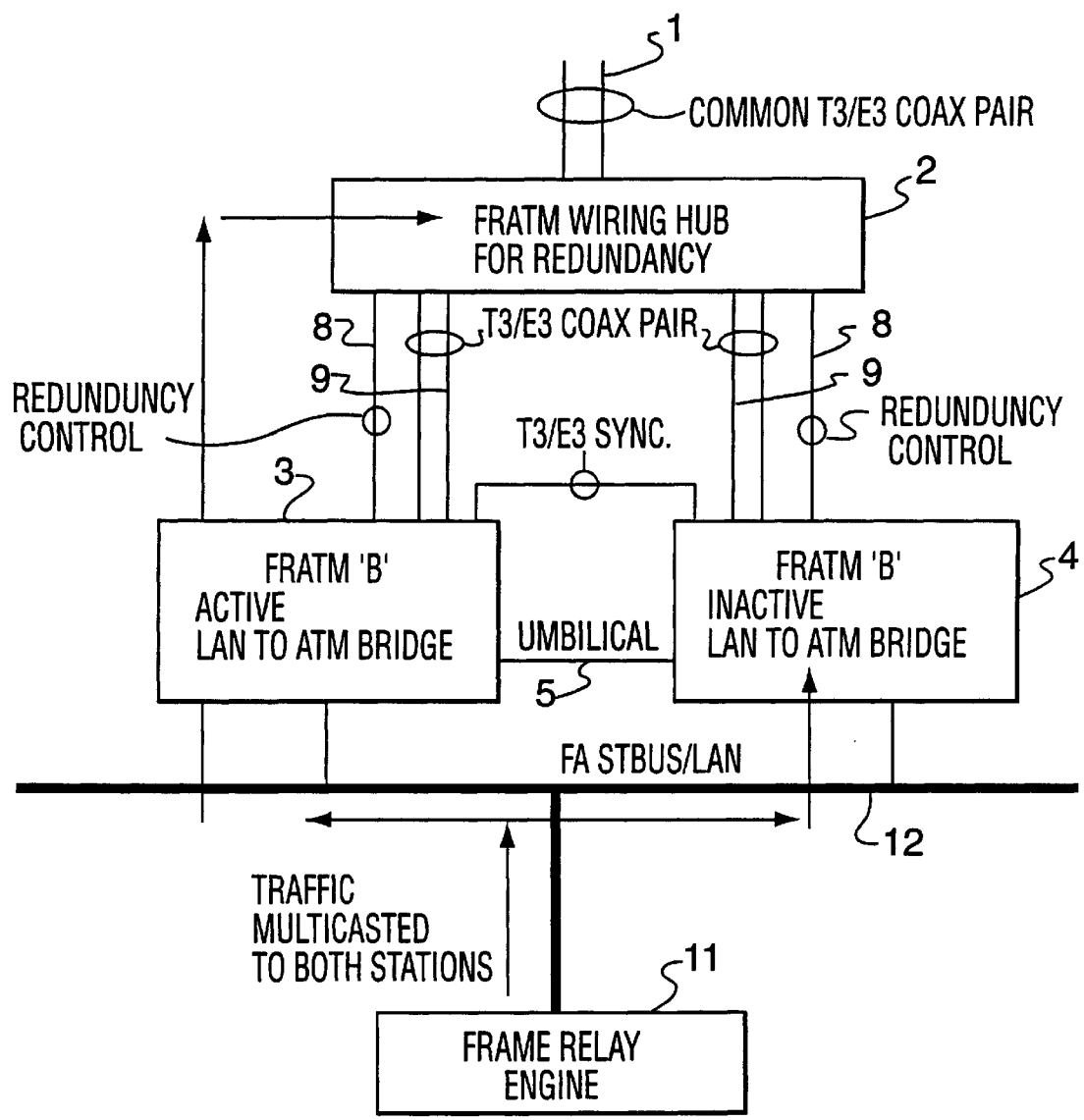
FIG. 2 is a block diagram of a system implementing redundancy in accordance with the invention.

Referring now to FIG. 2, which shows a FRATM system implementing redundancy in accordance with the invention, a T3/E3 coax pair 1 from an ATM network is connected to a FRATM redundant wiring hub 2. This is a passive DS3 interconnect device that allows two FRATM bridges 3, 4 to be connected to a common separate unit.

The wiring hub 2 is connected to respective FRATM bridges 3, 4 which are also interconnected by an umbilical connection 5.

The bridges 3, 4 are also connected to a bus 6, such as a Newbridge Fastbus™, which is a 100 Mbps bus used to interconnect Frame Relay Engine cards. WAN-to-LAN bridge 7 is also connected to bus 6.

in accordance with the invention, traffic is sent to both FRATMs 3, 4 over the bus 6, i.e. to both active and inactive bridges 3, 4 , using multicast addressing techniques from frame relay engine 11.

Each FRATM of the redundant pair 3, 4 has its T3/E3 9 interface wired to the redundancy hub 2. The active FRATM of the redundancy pair switches all traffic. If the active FRATM 3 performs an activity switch, the inactive FRATM becomes active and assumes data handling responsibilities.

A FRATM 3, 4 never assumes activity; activity must be released by the active FRATM. Activity can be released by the active FRATM. Activity can be released manually through the user interface or occur automatically when the presently active FRATM has more demerits than the inactive FRATM.

The FRATMs work on the demerit system. Demerits are maintained by each FRATM for itself and this value is shared with its mate FRATM. Demerits accrue for any conditions which decrease ability to function. Demerits are removed as conditions returns to normal.

When configured as redundant through the user interface, each FRATM automatically brings up a control link to its mate. It is used to transfer configuration and status information between nodes via 'mate' link 5 to its partner. The primary purpose of this link is to ensure that the two databases are kept in sync. The two redundant nodes share the same node number and all configuration traffic is handled by the active FRATM. Configuration information is then relayed to the inactive FRATM by the active FRATM using the mate link.

Once the mate link is up, the FRATMs determine which FRATM is active, which is inactive and will exchange unicast addresses between the partners. The inactive FRATM enables for itself the ability to receive frames on the multicast address used by the active FRATM. Thus all frames sent to the active FRATM by other stations on the FASTBus will also be received by the inactive FRATM.

The invention thus provides an effective yet simple means of implementing redundancy without the attendant problems of the prior art.

We claim:

1. A method of implementing redundancy in an interworking unit between frame relay and ATM networks, said interworking unit comprising a pair of frame relay to ATM (FRATM) bridges, said FRATM bridges being capable of alternately being in an inactive standby mode and an active mode, comprising the steps of:

placing one said FRATM bridge in the active mode and the other said FRATM bridge in the inactive mode;

sending data traffic from a frame relay engine connected to a frame relay network to said FRATM bridges in both said active and inactive modes over a LAN using multicast addressing;

processing the multicast data traffic for transfer between said networks in the FRATM bridge that is in the active mode;

passively snooping the multicast data traffic in the FRATM bridge that is in the inactive mode so that said FRATM bridge in the inactive mode remains current as to network status; and switching said FRATM bridges between the active and inactive modes according to the operability status thereof.

2. A method as claimed in claim 1, wherein said FRATM bridges exchange configuration and status information over a direct link therebetween.

3. A method as claimed in claim 1, wherein demerits that accrue for any conditions which decrease operability are maintained by each FRATM bridge, and said switching occurs when the presently active FRATM accumulates more demerits than the inactive FRATM.

4. A system for transferring data traffic between a frame relay network and an ATM network, comprising:

a pair of frame relay to ATM (FRATM) bridges, each said FRATM bridge being capable of transferring traffic between a frame relay and an ATM network, and said FRATM bridges being capable of alternately being in an inactive standby mode and an active mode, the FRATM bridge in the active mode processing the data traffic for transfer between said networks, and the FRATM bridge in the standby mode passively snooping the data traffic to remain current as to network status;

a frame relay engine for sending frame relay traffic to said FRATM bridges in both the inactive and active modes using multicast addressing over a LAN;

a wiring hub for connecting the FRATM bridges over a common link to an ATM network; and means for switching said FRATM bridges between the inactive and active modes, whereby the FRATM bridge previously in the inactive mode assumes the processing of the data traffic from the FRATM bridge that was previously in the active mode.

5. A system as claimed in claim 4, wherein said FRATM bridges accumulate demerit points and said switching means switches between modes when the presently active FRATM bridge has more demerit points than the presently inactive FRATM bridge.

6. A system as claimed in claim 4, wherein said switching means comprises a user interface.

7. A system as claimed in claim 5, wherein said LAN is a high speed bus.

8. A system as claimed in claim 4, further comprising a direct link between said FRATM bridges to permit them to exchange configuration and status information.

* * * * *